United States Patent
Ruddy et al.

(10) Patent No.: US 7,151,815 B2
(45) Date of Patent: Dec. 19, 2006

(54) NONINTRUSIVE METHOD FOR THE DETECTION OF CONCEALED SPECIAL NUCLEAR MATERIAL

(75) Inventors: Francis H. Ruddy, Monroeville, PA (US); Abdul R. Dulloo, Pittsburgh, PA (US); John G. Seidel, Pittsburgh, PA (US); Thomas V. Congedo, Pittsburgh, PA (US); Bojan Petrovic, Monroeville, PA (US); Vefa N. Kucukboyaci, Monroeville, PA (US)

(73) Assignee: Westinghouse Electric Co LLC, Pittsburgh, PA (US)

( * ) Notice: Subject to any disclaimer, the term of this patent is extended or adjusted under 35 U.S.C. 154(b) by 0 days.

(21) Appl. No.: 10/818,848

(22) Filed: Apr. 6, 2004

(65) Prior Publication Data

US 2005/0220247 A1    Oct. 6, 2005

(51) Int. Cl.
G21G 1/06 (2006.01)

(52) U.S. Cl. .................. 376/158; 376/257; 376/170; 376/180; 376/159; 376/156; 250/360.01

(58) Field of Classification Search ............... 376/257, 376/159, 154, 158, 156, 170, 180; 250/359.1, 250/370.05, 358.1, 390.01, 360.01
See application file for complete search history.

(56) References Cited

U.S. PATENT DOCUMENTS

| | | | | |
|---|---|---|---|---|
| 3,456,113 A | * | 7/1969 | Keepin | 376/254 |
| 3,636,353 A | * | 1/1972 | Untermyer | 376/194 |
| 3,699,338 A | * | 10/1972 | Baumann et al. | 250/391 |
| 3,767,919 A | * | 10/1973 | Michaelis | 376/159 |
| 4,483,816 A | * | 11/1984 | Caldwell et al. | 376/158 |
| 4,497,768 A | * | 2/1985 | Caldwell et al. | 376/153 |
| 4,568,511 A | * | 2/1986 | Givens | 376/159 |
| 4,620,099 A | * | 10/1986 | Schoenig et al. | 250/358.1 |
| 5,216,249 A | * | 6/1993 | Jones et al. | 250/370.05 |
| 5,940,460 A | * | 8/1999 | Seidel et al. | 376/153 |
| 5,969,359 A | * | 10/1999 | Ruddy et al. | 250/370.05 |
| 6,542,565 B1 | * | 4/2003 | Ruddy et al. | 376/153 |

OTHER PUBLICATIONS

Allen et al., "Nondestructive Fissile Isotopic Measurement Technique For Uranium-233—Uranium-235 Fuels Using Prompt and Delayed Neutron Counting," Nuclear Technology, vol. 47, Feb. 1980, pp. 363-377.*

Krinninger et al., "Pulsed Neutron Method For Non-Destructive and Simultaneous Determination of the U-235 and Pu-239 Contents of Irradiated and Non-Irradiated Reactor Fuel Elements," Nuclear Instruments and Methods, vol. 73, 1969, pp. 13-33.*

Merriam-Webster's Collegiate Dictionary, 10th Edition, 1993, p. 173.*

* cited by examiner

Primary Examiner—Ricardo J. Palabrica

(57) ABSTRACT

A method and associated apparatus for detecting concealed fissile, fissionable or special nuclear material in an article, such as a shipping container, is provided. The article is irradiated with a source of fast neutrons, and fast neutrons released by the fissile or fissionable material, if present, are detected between source neutron pulses. The method uses a neutron detector that can detect and discriminate fast neutrons in the presence of thermal neutrons and gamma radiation. The detector is able to process high count rates and is resistant to radiation damage, and is preferably a solid state neutron detector comprised of silicon carbide.

8 Claims, 4 Drawing Sheets

NONINTRUSIVE METHOD FOR THE DETECTION OF CONCEALED SPECIAL NUCLEAR MATERIAL

FIELD OF THE INVENTION

The present invention relates to a method of detecting concealed fissile or fissionable special nuclear material in an article, such as a shipping container. More particularly, the present invention relates to a method of detecting special nuclear material in an article, employing fast neutrons.

BACKGROUND INFORMATION

Several non-intrusive inspection systems, including X-ray scanning systems and neutron interrogation systems, have been developed and deployed for the detection of conventional explosives or narcotics. However, these systems are not adequate for the detection of the fissile material of a nuclear weapon hidden in a typical cargo container. X-ray techniques cannot easily differentiate the fissile material from innocuous heavy metals such as lead, tungsten and bismuth.

The most common neutron-based technique employed to detect fissile material is differential die-away (DDA). In this method, the item to be inspected is placed in a chamber or enclosure containing a pulsed source of energetic, or fast, neutrons. The fast neutrons slow down to thermal energies, and then die away over a period of microseconds to milliseconds, depending on the thermal neutron capture properties of the environment. If fissile material is present in the item, then fission events induced by thermal neutrons will perturb the die-away characteristics of the thermal neutron fluence rate due to the addition of fission neutrons.

Consequently, by monitoring the thermal neutron fluence rate die-away time with a thermal neutron detector between fast neutron pulses, the presence of fissile material in an item can be detected. The DDA technique suffers from the fact that the thermal neutron detectors typically employed for DDA cannot process very high event rates, and a significant waiting period after the pulse is needed before counting can begin in order to allow the detectors to recover from saturation effects due to the pulse. This time delay results in a significant reduction in detection sensitivity. Furthermore, DDA can be circumvented by placing a thermal neutron absorber, such as boron, lithium or cadmium, around the fissile material.

Simple gamma spectroscopy can also be employed to detect and identify fissile or fissionable material. This method relies on the detection of the decay radiation emitted from fissile or fissionable radionuclides by a high resolution gamma ray detector. However, the most prominent radiation emitted from fissile nuclides is typically low energy gamma rays, especially in the cases of uranium 235 and plutonium 239, and can therefore be absorbed with a modest amount of gamma shielding placed around the fissile device. Thus, a system relying solely on decay gamma detection can easily be circumvented.

Previous work in this area has been limited by a lack of sensitivity of detector electronics. For work employing pulsed neutron generators and gamma-ray detection, the short pulse durations (1–5 microseconds) were characterized by extremely high instantaneous neutron emission rates, and the resulting gamma ray flux was so large that the gamma-ray detector electronics were paralyzed. In addition, all systems—whether using electronic or isotopic neutron sources—were hampered by relatively poor signal-to-background noise ratios for peaks from trace constituents in a sample.

To enhance homeland security protection, new and/or improved technologies are needed to prevent and deter the smuggling of materials that can be employed for catastrophic terrorist attacks. These materials include constituents of nuclear, conventional (i.e., explosive), chemical and radioactive weapons. Detection of illicit attempts to transport these threat materials past points of entry, such as airports, ports and borders is a key component of the fight to protect the security of U.S. and allied countries. The current non-intrusive inspection methods for the detection of fissile material are either inadequate or can readily be circumvented.

SUMMARY OF THE INVENTION

The present invention provides a non-intrusive inspection method which overcomes many of the problems with prior technologies. In one aspect, the present invention provides a method of detecting fissile material in an article comprising: providing at least one fast neutron detector and at least one source of neutrons characterized by a particle intensity, source strength, pulse width and pulse frequency; irradiating the article with the at least one neutron source to effect emission of fast neutron radiation from the fissile material, if present; acquiring fast neutron data indicative of the number of fast neutrons emitted from the fissile material during a predetermined time period; and analyzing the data to determine the presence or absence of the fissile material.

The method, referred to as Prompt Neutron Neutron Activation Analysis (PNNAA), can detect concealed fissile or fissionable material in a container with high precision and is not affected by gamma shielding. As used herein, the term "fissile material" will be defined to include fissile material, fissionable material and special nuclear material, as those terms are understood in the art, and will be used to refer to nuclear materials characterized as having nuclei which are capable of undergoing fission. Examples of such materials include, but are not limited to, isotopes of thorium, uranium, neptunium, plutonium, americium, and elements of higher atomic number. Isotopes of principal interest in common application include $^{233}U$, $^{235}U$, $^{239}Pu$ and $^{241}Pu$. Any isotope or mix of isotopes which undergoes nuclear fission induced by incident neutrons will produce energetic fission neutrons which the disclosed method is capable of employing for detection.

PNNAA relies on the detection of prompt fast fission neutrons emitted by fissile or fissionable nuclides during the time interval between pulses of fast source neutrons. As used herein, "fast neutrons" refers to neutrons having an energy greater than about 100 keV. Because the fast source neutrons die away within less than a microsecond after the end of a pulse, the fast neutron background between pulses is insignificant if the period is of the order of microseconds and the detector counting is set to start after the end of a pulse and set to stop before the start of the next pulse. If fissile material is present in the container, then fast fission neutrons will be emitted between pulses through fission events induced by both fast and thermal neutrons, and their detection will provide an unambiguous indication of the presence of fissile material. Unlike DDA, PNNAA relies on the direct measurement of fast (i.e., energetic) neutrons produced by fission, and is therefore less subject to interference than DDA.

In an additional aspect, the present invention provides an apparatus for detecting fissile material in an article comprising: a neutron source for generating neutrons characterized by a particle energy, source strength, pulse width and pulse frequency; at least one fast neutron detector for detecting the fast neutron radiation emitted from the article; source electronics means associated with the neutron source for controlling the pulse width of neutrons generated by the neutron source; detector electronics means associated with the at least one fast neutron detector for amplifying and digitalizing signals generated by the at least one fast neutron detector and storing data representing the digitalized signals; spectral analysis means for analyzing the data and determining the presence or absence of fast neutron emission from the article; and an acquisition interface module (AIM) for controlling the timing of the source and detector electronics such that the neutron source generates neutrons in a burst of a prescribed pulse width and the detectors and detector electronics means detect fast neutrons during the time interval between bursts and acquire data indicative of the number of fast neutrons emitted in the time interval between successive bursts.

PNNAA relies on a neutron detector that can detect and discriminate fast neutrons in the presence of thermal neutrons and gamma radiation. The detector is able to process high count rates and is resistant to radiation damage, and is preferably a solid state neutron detector comprised of silicon carbide. This type of detector has excellent resistance to radiation damage and has a fast charge-collection time, which enables it to process very high count rates. The silicon carbide detectors are highly insensitive to both thermal neutrons and gamma rays.

It is an aspect of the present invention, therefore, to provide a method of detecting fissile material in an article, such as a shipping container, by detecting fast neutron emission from the fissile material.

It is an additional aspect of the invention to provide a method of detecting fissile material in an article by detecting fast neutron emission from the fissile material with a solid-state neutron detector.

In an additional aspect, the present invention provides an apparatus for the detection of fissile material in an article such as a shipping container, by detecting fast neutron emission from the fissile material.

These and other aspects of the present invention will become more readily apparent from the following drawings, detailed description and appended claims.

BRIEF DESCRIPTION OF THE DRAWINGS

The invention is further illustrated by the following non-limiting drawings in which.

DETAILED DESCRIPTION OF PREFERRED EMBODIMENTS

Figure 1:
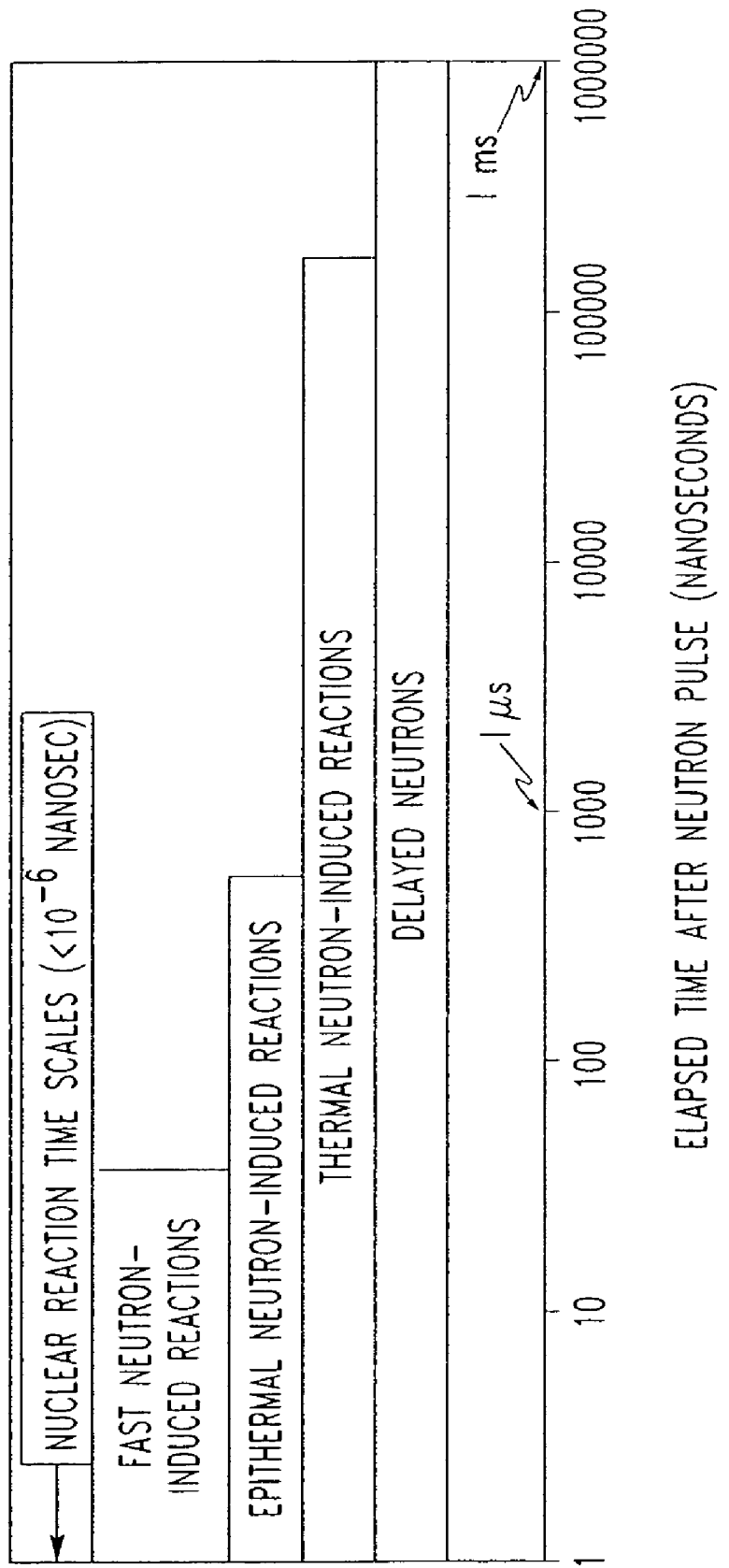
FIG. 1 is a timing diagram in accordance with the present invention, showing approximate times scales for neutron detection. Only PNNAA is capable of detecting all reaction types with high sensitivity.

The present invention provides a method of detecting fissile material in an article by providing at least one fast neutron detector and a source of neutrons characterized by a particle energy, a source strength (number of neutrons per unit time), a pulse width and a pulse frequency. As used herein, the term "article" refers to any container which can be used to conceal fissile material. Exemplary articles include, but are not limited to, shipping containers, packages, luggage and the like. The method of the present invention can be used to scan any article to determine the presence or absence of fissile material. The article is irradiated with the neutron source to effect emission of fast neutron radiation from the article. Fast neutron data indicative of the number of fast fission neutrons emitted from the fissile material during a predetermined time interval is collected and analyzed to determine the presence or absence of fissile material.

In order to produce pulses of neutrons on a time scale which can be employed in the disclosed method, the most commonly used neutron sources are electronic neutron generator tubes of the type developed for oil well logging applications. These tubes contain a compact accelerator which propels deuterons into tritium or deuterium at an incident kinetic energy of 100–200 keV. This produces fusion reactions, with a resulting neutron yield. The D+T reactions produce 14 MeV neutrons and the D+D reactions produce 2–3 MeV neutrons. It may be desirable to use a combination of neutron sources to penetrate the article or container at different depths, thus ensuring complete evaluation of the article. Other systems (e.g., the proton linear accelerator approach, the RFQ system or other accelerator-based systems which provide up to 25 MeV neutrons) capable of providing a controllable, regular pattern of neutron bursts can also be used. At least one neutron source is used, and in one embodiment, a plurality of sources can be used.

Therefore, in one aspect the method includes generating neutrons with energies of approximately 25 MeV, 14 MeV, 2.5 MeV, and 0.025 eV. While these energies are conveniently available, other energies are also available and useful for various applications, e.g., 750 keV neutrons can be produced using a proton linear accelerator and a lithium target. As the initially energetic neutrons migrate through the materials contained within the inspected article, natural collision processes will slow the neutrons, until they eventually reach a kinetic energy of approximately 0.025 eV, which is the average kinetic energy of the atoms of a substance at room temperature. At this point, the neutrons are said to be in thermal equilibrium with the environment, and are termed "thermal neutrons". Depending on the isotope, fission reactions can be induced copiously by these "thermal" neutrons, whereas for some of the isotopes of interest fission reactions can only be induced by the neutrons while they are still quite energetic (kinetic energy on the order of 1 MeV). Hence, the selection and placement of neutron sources is based on considering requirements of neutron energy and penetration of the sample. This selection is typically based on computer calculations modeling a diverse sampling of such articles, which can be readily performed by one skilled in the art.

PNNAA relies on detection of the fast fission neutrons produced by (n, fission) reactions to indicate if fissile material is present in a container. A pulsed neutron source is employed to provide energetic source neutrons that can penetrate into the container and produce fission neutrons in any fissile material present. The key to PNNAA is to discriminate fission neutrons from source neutrons. This discrimination is achieved by using time-sequenced neutron measurements with fast-response SiC neutron detectors. See, e.g., "Development of a Silicon Carbide Radiation Detector", F. H. Ruddy, A. R. Dulloo, J. G. Seidel, S. Seshadri, and L. B. Rowland, IEEE Transactions on Nuclear Science NS-45, 536 (1998); "The Thermal Neutron Response of Miniature Silicon Carbide Semiconductor Detectors", A. R. Dulloo, F. H. Ruddy, J. G. Seidel, J. M. Adams, J. S. Nico, and D. M. Gilliam, Nuclear Instruments and Methods A, 498, 415 (2003); "Simultaneous Measurement of Neutron and Gamma-Ray Radiation Levels from a TRIGA Reactor Core Using Silicon Carbide Semiconductor Detectors", A. R. Dulloo, F. H. Ruddy, J. G. Seidel, C. Davison, T. Flinchbaugh, and T. Daubenspeck, IEEE Transactions on Nuclear Science 46, 275 (1999). These detectors have charge collection times of less than 5 nanoseconds, which allows processing of very high count rates. Previous work has shown that SiC detectors can detect high-energy neutrons in the presence of a thermal neutron field and a high gamma-ray background through the nuclear reactions of these neutrons with Si and C nuclei of the detector. See, e.g. "Monitoring of D-T Accelerator Neutron Output in a PGNAA System Using Silicon Carbide Detectors", A. R. Dulloo, F. H. Ruddy, J. G. Seidel, and B. Petrovic, *Applications of Accelerators in Research and Industry—Sixteenth International Conference*, AIP CP576 (2001); "Fast Neutron Spectrometry Using Silicon Carbide Detectors", F. H. Ruddy, A. R. Dulloo, B. Petrovic, and J. G. Seidel, in *Reactor Dosimetry in the 21$^{st}$ Century*, J. Wagemans, H. A. Abderrahim, P. D'hondt, and C. De Raedt (Eds.), World Scientific, London (2003) pp 347–355.

As used herein, the term "pulse width" refers to the time duration of the neutron pulse, e.g., the time interval during which the source is emitting neutrons. Typically, the pulse width of the neutron beam emanating from the source will be between about 4 nanoseconds to 200 microseconds. The pulse frequency will be between about 100 to 10,000,000 Hz, which translates into an interval between pulses of about 10 milliseconds to 100 nanoseconds.

FIG. 1 illustrates a set of neutron reaction time scales. Neutron reactions occur over time periods of less than $10^{-15}$ s, which is instantaneous for detection/counting purposes. However, the time scale for observation of neutron-induced reactions is controlled by other factors, including neutron time-of-flight and capture rates. Neutrons in the 1–14 MeV range will travel 1–5 cm per nanosecond and the time scale for observation of reactions induced by these neutrons will be dominated by time-of-flight considerations, such as, the distance of the fissile material from the neutron source and the detector. The reaction time scale of lower-energy neutrons, e.g., 1 eV, is controlled primarily by neutron lifetime before capture. Fast neutrons are generally thermalized within a microsecond. The prior Prompt Gamma Neutron Activation Analysis (PGNAA) work of the inventors has shown that thermal neutron capture reaction rates decrease by a factor of two in time periods in the 200–400 microsecond range, depending on the thermal neutron capture properties of the surroundings. See, e.g., "Neutron Fluence Rate Measurements in a PGNAA 208-Liter Drum Assay System Using Silicon Carbide Detectors," A, R. Dulloo, F. H. Ruddy, J. G. Seidel, S. Lee, B. Petrovic, and M. E. McIlwain, Nuclear Instruments and Methods B 213 (2003) pp 400–405.

Consider a time interval starting one microsecond after the end of one pulse and ending before the start of the next pulse. In this interval, fast source neutrons have already thermalized or escaped from the system. If fissile material is present, the thermal neutrons will induce fission reactions, which in turn release fast fission neutrons. Consequently, fast neutrons detected during this interval can be correlated with the presence of fissile material. PNNAA with SiC detector technology has excellent sensitivity for fissile material detection because of the near-zero fast-neutron background in this interval. In addition, the rapid response of SiC detectors eliminates any detector saturation concern and allows counting throughout this period.

Bench scale laboratory tests were conducted using a single 6-mm diameter-equivalent SiC neutron detector and a 14-MeV pulsed neutron source. A PNNAA run was performed with a 5.2-gram sample of 93.16%-enriched U-235. Detector counts were recorded in the time interval between pulses. For comparison, a PNNAA run without the U-235 sample was also performed. The measured count rates were $0.237 \pm 0.013$ ($\pm 5.5\%$) counts s$^{-1}$ with the U-235 sample and $0.024 \pm 0.005$ ($\pm 21\%$) counts s$^{-1}$ without the U-235 sample present. This PNNAA test, involving a very small amount of fissile material (<0.05% of the amount needed for a bomb), demonstrates unambiguously that PNNAA can detect fissile material with high sensitivity, since the count rate in the presence of U-235 is almost ten times the background count rate.

Fissile material-detection techniques that rely solely on thermal-neutron reactions in the material can be circumvented by reducing the thermal neutron flux with a thermal neutron absorber (e.g., boron, cadmium, lithium). These absorbers are less effective at preventing fast or even epithermal neutron-induced reactions in the material. Consequently, PNNAA can potentially overcome such masking attempts through detection of neutrons emitted by energetic (non-thermal) neutron-induced fission. A fast-response detector, such as SiC, is needed to take advantage of energetic neutron-induced reactions due to the time scale involved (see FIG. 1). Further, neutron source pulses should preferably be about 10-ns wide or less. Finally, due to potential interference from (n, xn) reactions in surrounding materials, the source neutron energy should preferably be less than the energy threshold of these reactions. As used herein, the term "source strength" refers to the number of neutrons per second emitted by the neutron source. The neutron source should be able to provide about $10^7$ to $10^{12}$ neutrons per second.

Figure 2A:
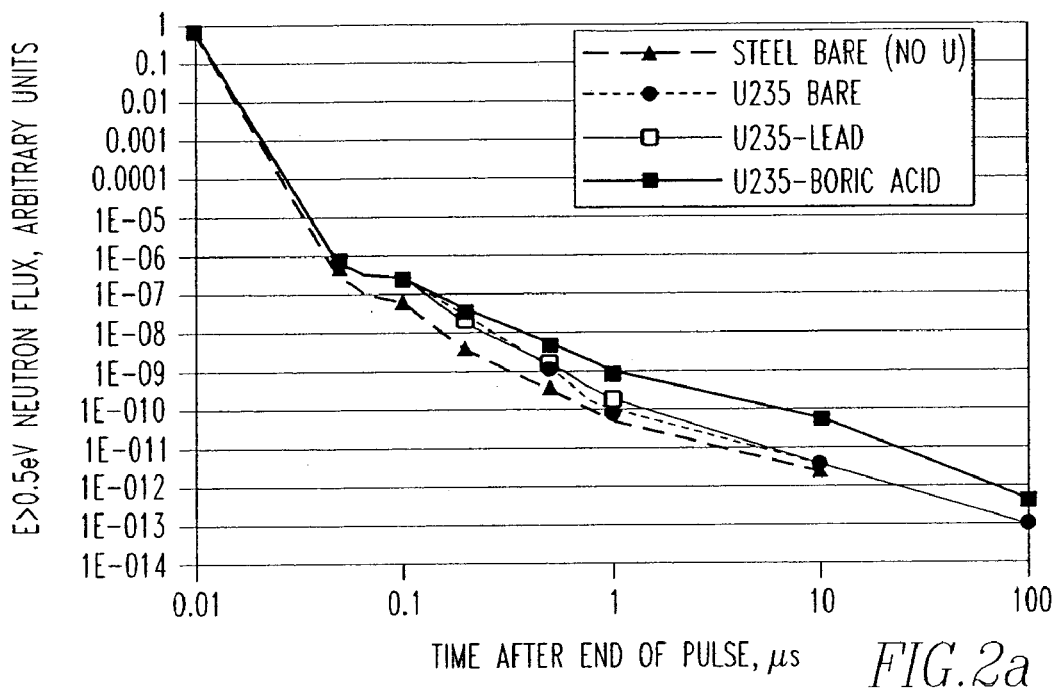
FIGS. 2a–2b are diagrams showing the time behavior of the E>0.5 eV (2a) and the E>1 MeV (2b) neutron fluxes. The calculated flux value for the case where no U-235 is present (bare steel) drops to zero after 10 microseconds from the end of the pulse in the E>0.5 eV case and after 0.1 microsecond in the E>1 MeV case.
Figure 2B:
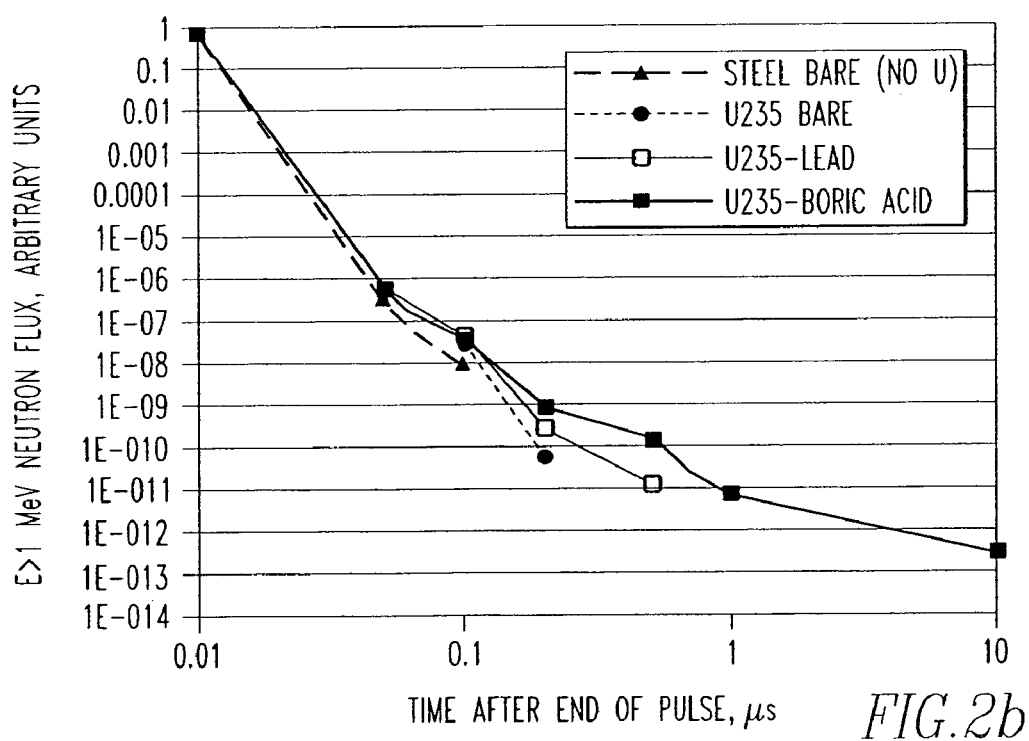

As a preliminary investigation of fissile material detection based on energetic-neutron reactions, calculations using the MCNP-4b Code were performed with a simple configuration consisting of a 100-cm$^3$ U-235 sphere placed at a distance of 50 cm from a 6.5-MeV neutron source (energy chosen to minimize interference from [n, xn] reactions). See, e.g., J. F. Briesmeister, Ed., "MCNP—A General Monte Carlo N-Particle Transport Code, Version 4B," LA-12625-M, Los Alamos National Laboratory, March, 1997. The neutron flux was studied as a function of time from the end of a pulse at a 50-cm distance from the sphere. Calculations with bare U-235 and with boric acid (an easily-acquired thermal-neutron absorber) and lead (a common high-Z material) present around the U-235 were performed. The results from these cases are shown in FIG. 2. Results from a calculation done with steel substituted for U-235 are also shown to provide a baseline where no fissile material is present in the system.

The data in FIG. 2 indicate that: (a) the presence of U-235 significantly prolongs the die-away of both the E>0.5 eV and E>1 MeV neutron flux in the 0.1 to 1 microsecond range; (b) lead has very little impact on this effect; and (c) boric acid appears to enhance the effect in both flux cases and extends the time scale to greater than 100 microseconds in the E>0.5 eV flux case. This enhancement is thought to be due to the extra moderation provided by the hydrogen, boron and oxygen nuclides of the boric acid. Neutron moderation in this energy regime more than offsets neutron capture by the boron-10 nuclide, and, consequently, more fission events occur in the U-235. Thus, fast- and epithermal-neutron fission die-away measurements overcome a major weakness of existing neutron-based interrogation systems.

Finally, in pulsed neutron systems, the delayed fission neutron flux is expected to reach an equilibrium value during the interrogation period. Hence, delayed fission neutrons will make a small and time-independent contribution to the PNNAA signal if fissile material is present.

The fast neutron detector employed in this method is preferably a solid state neutron detector. A particularly preferred, radiation resistant, neutron detector employs a semiconductor active region fabricated from silicon carbide (SiC). Use of suitable semiconductors having active regions comprised of other materials such as silicon, cadmium zinc telluride (CZT), cadmium telluride, gallium arsenide or diamond, is also contemplated and within the scope of the present invention.

Figure 3:
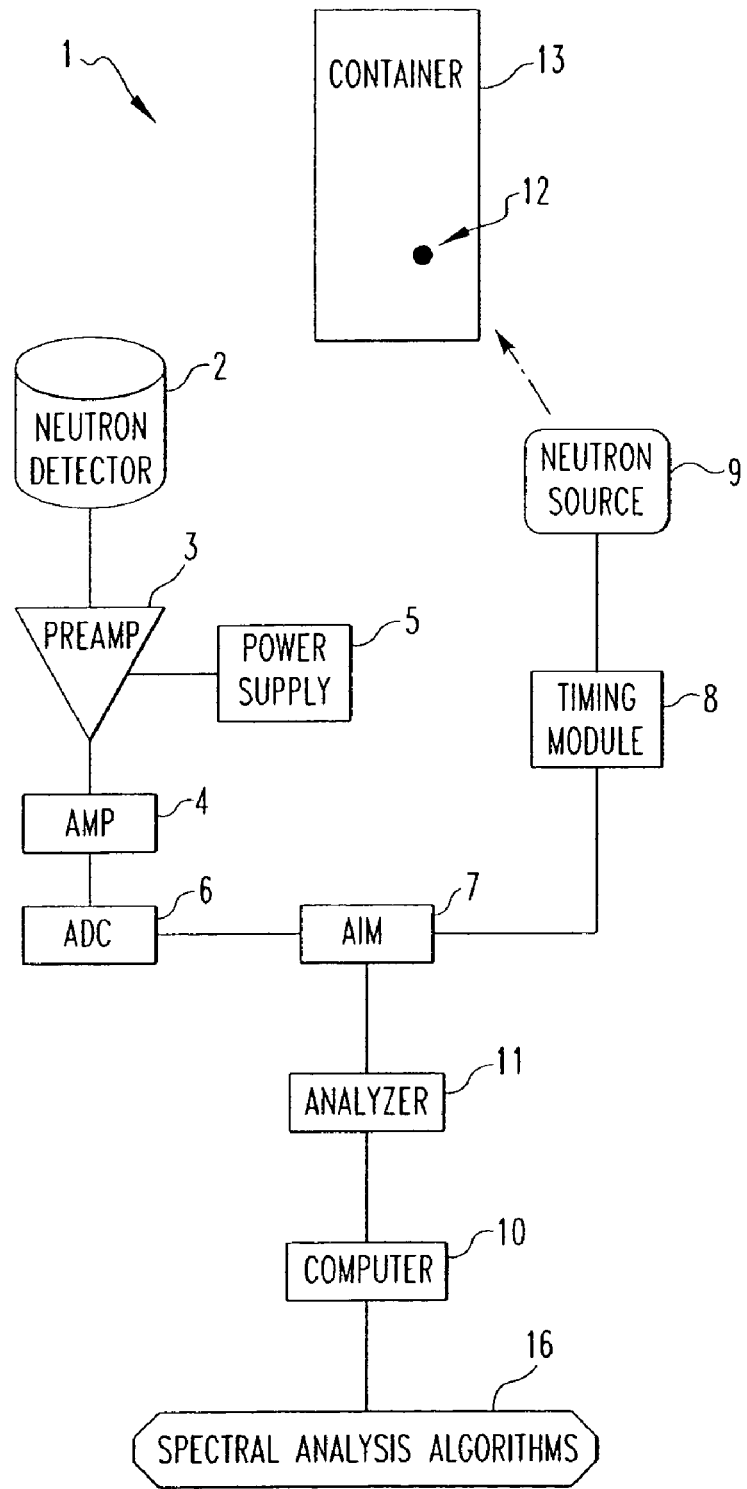
FIG. 3 is a block diagram of a PNNAA system in accordance with an embodiment of the present invention.

Referring to FIG. 3, an exemplary PNNAA system 1 includes a suitable neutron detector 2; a suitable high speed, high throughput count rate preamplifier (PREAMP) 3; a high count rate, high speed spectroscopy amplifier (AMP) 4; a detector high voltage supply 5; a high speed analog-to-digital converter (ADC) 6; an Acquisition Interface Module (AIM) 7; a special neutron generator timing module 8; and a pulsed neutron source or generator 9. The timing module 8 provides for time-correlated data acquisition to coordinate firing of the neutron generator 9 with fast neutron emission data acquisition. Such time-correlated data acquisition techniques are known in the art. The system 1 also includes a suitable computer 10, such as a high speed minicomputer, and multi-channel analyzer software 11, which is typically integrated with or loaded on the computer 10, along with spectral analysis algorithms 16. See, for example, Dulloo, A. R. et al., *Nuclear Technology*, "Detection Limits of a Laboratory Pulsed Gamma Neutron Activation Analysis System for the Nondestructive Assay of Mercury, Cadmium and Lead", A. R. Dulloo, F. H. Ruddy, T. V. Congedo, J. G. Seidel, and R. J. Gehrke, Nuclear Technology 123, 103 (1998); and U.S. Pat. No. 5,539,788. The AIM is a commercially available product made by Canberra Industries of Meriden, Conn.

It will be appreciated that, while reference has been made to the exemplary computer 10, a wide range of other processors such as, for example, mainframe computers, workstations, personal computers (e.g., network or standalone), microcomputers, and other microprocessor-based computers may be employed.

In an additional aspect, the present invention provides an apparatus for detecting fissile or fissionable material in an article. The apparatus comprises a neutron source for generating neutrons of a predetermined energy; at least one fast neutron detector for detecting the fast neutron radiation emitted from the article; source electronics means associated with the neutron source for controlling pulse width, pulse frequency and source strength of neutrons generated by the neutron source; detector electronics means associated with the fast neutron detectors for amplifying and digitalizing signals generated by the fast neutron detectors and storing data representing the digitalized signals; spectral analysis means for analyzing the data and determining the presence or absence of fast neutron emission from the article; and an acquisition interface module (AIM) for controlling the timing of the source and detector electronics such that the neutron source generates neutrons in a burst of a prescribed pulse width and the detectors and detector electronics means detect fast neutrons during the time interval (referred to herein as the pulse interval) between the bursts and acquire data, indicative of the number of fast neutrons emitted during the time interval between bursts.

The PNNAA system can be enhanced in many ways. In one embodiment, through integration with an X-ray screening system, PNNAA can verify whether a high density region in a container detected by the X-ray system is special nuclear material or not. In an additional embodiment, it can be integrated with a gamma-ray detector, and the capability to detect explosives and chemical warfare agents through prompt gamma neutron activation analysis can be implemented.

The PNNAA system can be used directly on individual packages identified as suspicious by previous data or intelligence. For the examination of large cargo containers, coupling of the system with a known form of high reliability primary scanning will provide maximum efficiency and economy.

Figure 4:
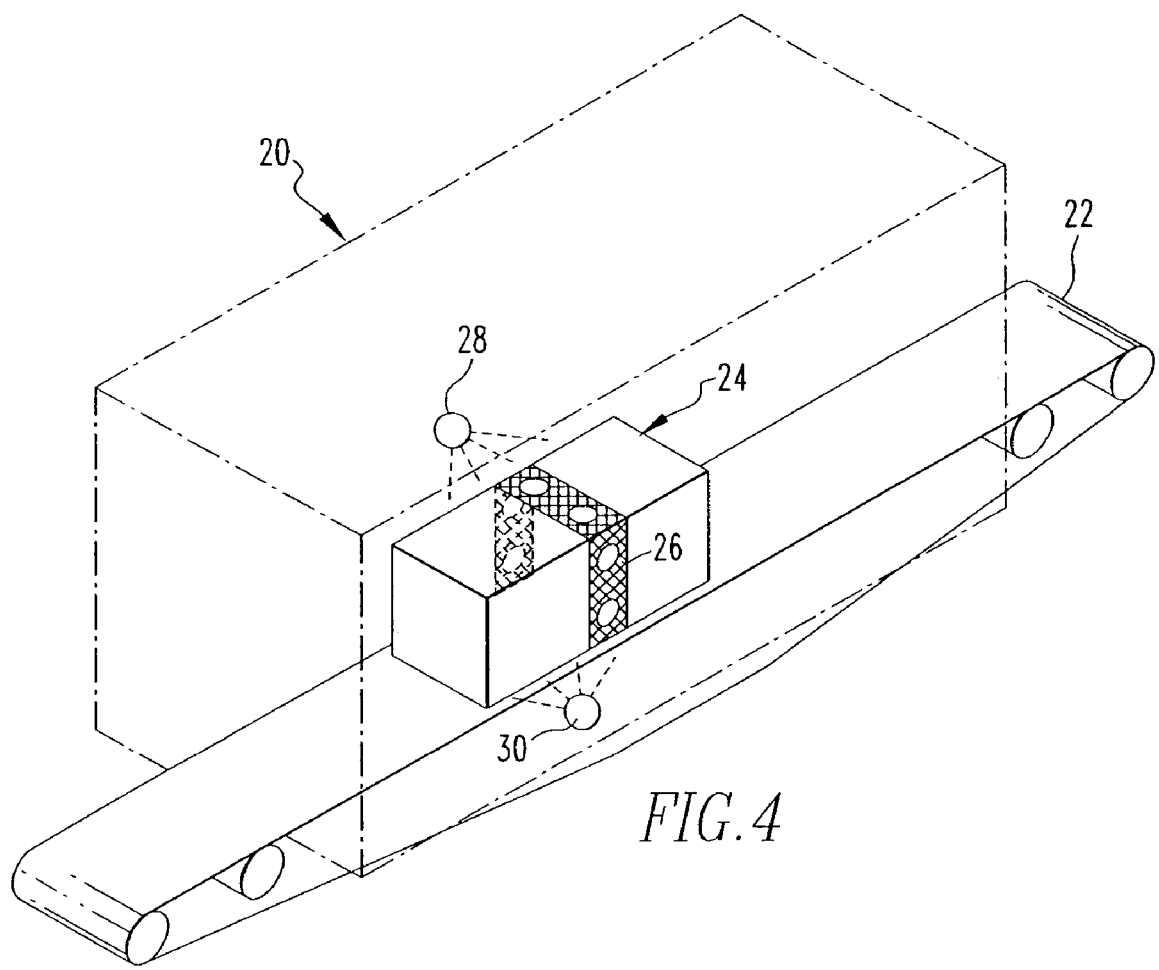
FIG. 4 is a schematic view of an additional embodiment of the present invention.

In such a case, a suitable primary scan by an X-ray or other methods could isolate a region of a shipping container containing a suspicious item of cargo. For fissile material, this would probably correspond to an agglomeration of high density material in a transmission X-ray image or tomographic reconstruction. This could be either the fissile material itself or heavy metals such as lead, tungsten or bismuth, used to shield gamma rays from detection by the passive methods described above. FIG. 4 presents a diagram of a preferred embodiment in which a conveyor-based system is used for PNNAA scanning of a cargo container. In this embodiment, the apparatus further comprises a protective enclosure 20 having a wall made of a neutron-reflecting material and a conveyor 22 for supporting the article 24 in the protective enclosure. The protective enclosure 20 is designed to provide partial thermalization (slowing down) of neutrons, and to provide radiation protection. A plurality of detectors 26 are used, wired into distinct individual chains, to ensure high sensitivity and to provide coarse spatial resolution. One or more neutron sources 28, 30 are used to irradiate the article.

Conveyor systems have already been successfully deployed for high energy X-ray investigation of cargo containers at Japanese ports by BIR Inc. (Bio-Imaging Research, Inc., 425 Barclay Boulevard, Lincolnshire, Ill. 60069), in cooperation with the Japanese government. Beginning with such a platform, the inclusion of a conveyor segment dedicated to PNNAA would simply constitute an extension of the mechanical system already deployed.

Whereas particular embodiments of this invention have been described above for purposes of illustration, it will be evident to those skilled in the art that numerous variations of the details of the present invention may be made without departing from the invention as defined in the appending claims.

What is claimed is:

1. A method of detecting concealed fissile material in an article, where the presence of the concealed fissile material is unknown, comprising:

providing at least one solid state fast neutron detector and at least one source of irradiating fast neutrons, the irradiating fast neutrons characterized by a particle energy, a pulse strength, a pulse width and a pulse frequency, wherein said pulse width is about 4 ns to 200 µs, said pulse frequency is about 100 to 10,000,000 Hz and said pulse strength is approximately $10^7$ to $10^{12}$ neutrons per second;

irradiating said article with said irradiating fast neutrons to effect emission of prompt, fast neutron radiation from said fissile material directly resulting from fissions occurring from neutron irradiation by said at least one neutron source, if the fissile material is present in the article and determine the presence of fissile material in the article;

monitoring the emissions of such prompt fast neutron radiation directly resulting from fissions occurring from the neutron irradiation by said at least one neutron source, with the solid state fast neutron detector capable of discriminating between fast neutrons and thermal and epithermal neutrons and collecting counts of the prompt fast neutrons detected in the time between pulse widths without saturating;

acquiring prompt fast neutron data indicative of a number of prompt fast fission neutrons emitted from said fissile material during a predetermined time period; and analyzing said data to determine the presence or absence of said fissile material.

2. The method of claim 1, wherein said neutron detector is comprised of SiC.

3. The method of claim 1, wherein said neutron detector is comprised of a material selected from the group consisting of silicon carbide, cadmium zinc telluride (CZT), cadmium telluride, gallium arsenide and diamond.

4. The method of claim 1, wherein said particle energy of said neutron source irradiating the article is between 1 Mev and 25 Mev.

5. The method of claim 1, wherein said particle energy of said neutron source irradiating the article is selected from the group consisting of 2.5 Mev and 14 Mev.

6. The method of claim 1, wherein said article is a cargo container.

7. The method of claim 1, wherein said at least one neutron source is a plurality of neutron sources.

8. The method of claim 1, wherein said at least one neutron detector is a plurality of neutron detectors.

* * * * *